(12) United States Patent
Engstrand et al.

(10) Patent No.: US 6,975,643 B2
(45) Date of Patent: Dec. 13, 2005

(54) QUEUE MANAGEMENT IN PACKET SWITCHED NETWORKS

(75) Inventors: Rolf Georg Engstrand, Skärholmen (SE); Christer Landberg, Huddinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 900 days.

(21) Appl. No.: 09/866,540

(22) Filed: May 29, 2001

(65) Prior Publication Data

US 2002/0009080 A1 Jan. 24, 2002

Related U.S. Application Data

(63) Continuation of application No. PCT/SE99/02104, filed on Nov. 17, 1999.

(30) Foreign Application Priority Data

Dec. 1, 1998 (SE) .............................................. 9804171

(51) Int. Cl.⁷ .............................. H04L 12/42; H04J 3/16
(52) U.S. Cl. ....................................... 370/449; 370/468
(58) Field of Search ................................ 370/390, 392, 370/412, 420, 432, 439, 442, 445, 447, 458, 449, 468, 465, 252

(56) References Cited

U.S. PATENT DOCUMENTS

| | | | |
|---|---|---|---|
| 5,297,144 A | 3/1994 | Gilbert et al. | |
| 5,327,432 A | 7/1994 | Zein Al Abedeen et al. | |
| 5,677,909 A | 10/1997 | Heide | |
| 5,926,458 A | * 7/1999 | Yin | 370/412 |
| 5,978,374 A | * 11/1999 | Ghaibeh et al. | 370/443 |
| 6,092,115 A | * 7/2000 | Choudhury et al. | 709/235 |
| 6,108,306 A | * 8/2000 | Kalkunte et al. | 370/422 |
| 6,269,078 B1 | * 7/2001 | Lakshman et al. | 370/468 |
| 6,338,090 B1 | * 1/2002 | Emmes et al. | 709/234 |
| 6,658,009 B1 | * 12/2003 | Yamashita et al. | 370/449 |

FOREIGN PATENT DOCUMENTS

| | | |
|---|---|---|
| FR | 2762947 A1 | 11/1998 |
| WO | 98/44758 A1 | 10/1998 |
| WO | 98/54858 A1 | 12/1998 |

* cited by examiner

*Primary Examiner*—Andy Lee
(74) *Attorney, Agent, or Firm*—Nixon & Vanderhye P.C.

(57) ABSTRACT

In a multipoint-to-point link, packets are transmitted over a shared medium to a central node in response to permits. The central node issues permits to a multipoint node on the basis of a queue size record, held at the central node. The queue record is updated on receipt of a queue size report (request for permits) from the multipoint node. Due to the transmission delays across the link, an erroneous queue value can be recorded at the central node when permits and a request for permits are sent at about the same time. This problem is overcome and the transfer capacity improved when the central node holds a record of the permits sent during the preceding round trip delay. Any incoming reqest for permits is then adjusted by the number of stored permits before it is utilized to update the queue record.

14 Claims, 9 Drawing Sheets

QUEUE MANAGEMENT IN PACKET SWITCHED NETWORKS

This is a continuation of PCT application No. PCT/SE99/02104, filed 17 Nov. 1999, the entire content of which is hereby incorporated by reference in this application.

FIELD OF INVENTION

The invention relates to media access control (MAC) in packet switched networks. It is particularly directed to the management of the transfer of packets between a central node and one of several multipoint nodes over a shared medium.

BACKGROUND ART

Media access control of a point-to-multipoint link in a packet switched network is a mechanism for determining which of a plurality of nodes at the multipoint end of the link is allowed to send a packet over the shared medium to a single central node located at the other end of the link. In a conventional media access control mechanism utilised in two-way TDMA transfer links, the central node appends permit information, commonly called a permit, to every packet that it sends. The permit is addressed to one of the multipoint nodes and specifies which time slot in the future packet stream can be utilised by the addressed multipoint node to send a packet.

Permits are allocated in response to requests. The multipoint nodes send requests, typically in the form of queue size information, when packets are present at the node awaiting transfer. The central node sends corresponding permits and will also manage the allocation of priorities when the requests for permits arrive more frequently than permits can be sent. To this end, each multipoint node has a queue that stores packets until the node is permitted to pass them on.

Each multipoint node records the number of queued packets awaiting transmission so that a corresponding permit request may be sent to the central node. The central node also holds a record of the queue lengths at each multipoint node. On the basis of this queue record, the central node issues permits to those multipoint nodes requiring channel capacity.

The queue record in the central node is updated by queue information in the form of a permit request received from the multipoint node. This request represents the current queue size at the multipoint node and is used to overwrite the recorded queue size at the central node. The recorded queue size at the central node is also decremented each time a permit to send a packet is transmitted to the corresponding multipoint node.

The transfer of information between a central node and a multipoint node involves a delay, which depends on the available bandwidth and length of the transfer medium. A delay also occurs at the multipoint node when processing permits received from the central node. Hence there exists a window during which a multipoint node may transmit a permit request and the central node may transmit permits to the same multipoint node on the basis of the queue record before receiving the permit request. When the permit request reaches the central node, the queue record will be overwritten by an erroneous queue size value. While this error will not cause the loss of packets, it can lead to more permits being sent than are actually required. It is possible that the discrepancy between the actual and recorded queue size will be mitigated to some extent by further packets arriving at the multipoint node, however, on balance there is a high probability that the central node will issue permits that cannot be used. Channel capacity will thus be wasted.

SUMMARY OF INVENTION

It is an object of the present invention to provide a method and arrangement which alleviates the problems of the prior art.

It is a further object of the present invention to provide a method and arrangement which substantially improves the utilisation of channel capacity in a multipoint-to-point link.

This object is achieved with a method whereby a traffic receiving node, which holds a queue record of the number of packets awaiting transfer at a traffic sending node, stores the number of permits, or the equivalent number of packet transfers enabled by the permits, for a predetermined delay after transmission of each permit, and modifies the value of any incoming requests for permits by the number of permits stored. The delay preferably corresponds to the round trip delay between the two nodes in question. This is the sum of the permit delay and the report delay, i.e. the total time between a permit being sent by the traffic receiving node and the corresponding (permitted) traffic packet being sent by the traffic sending node. This delay also includes the processing delay required by the traffic sending node to recognise, or process, the permit.

The invention further resides in a node in a communication network that receives traffic from at least one further node over a shared medium. The node is arranged to store the number of permits sent to the further node, or the equivalent number of packet transfers enabled with these permits, for a predetermined delay after transmission of each permit, and to modify any incoming queue size report from the same further node by the value of stored permits.

There is further proposed a communication network including a central node and several multipoint nodes, the multipoint nodes being connected to said central node by a shared medium. The central node holds a queue size record for each multipoint node and includes means for storing the number of permits sent to respective multipoint nodes, or the equivalent number of packet transfers enabled, for a predetermined delay and modifying any incoming queue size records corresponding to the multipoint node in question by the value of stored permits.

Storing the number of permits sent in the preceding round trip delay effectively establishes the number of permits that can not yet have been processed and responded to by the corresponding multipoint node. Any queue size record, or request for permits, received from the corresponding multipoint node within this period will have been issued without knowledge of the permits. By modifying this record value using the number of permits sent, or the equivalent number of packets enabled if one permit allows more than one packet to be transmitted, the reported queue size will be corrected and the correct value used to overwrite the queue record in the central node.

By means of the method and the node and network arrangements according to the invention, the queue size record in the traffic receiving node will be constantly adjusted to reflect the actual number of permits required. The conventional overestimation of queue size and the resulting allocation of unused time slots will thus be eliminated. Consequently, the transfer capacity and efficiency of a network will be improved.

BRIEF DESCRIPTION OF THE DRAWINGS

Further objects and advantages of the present invention will become apparent from the following description of the preferred embodiments that are given by way of example with reference to the accompanying drawings, in which.

DETAILED DESCRIPTION OF THE DRAWINGS

In the figures, like reference numerals are used for similar or identical components.

Figure 1:
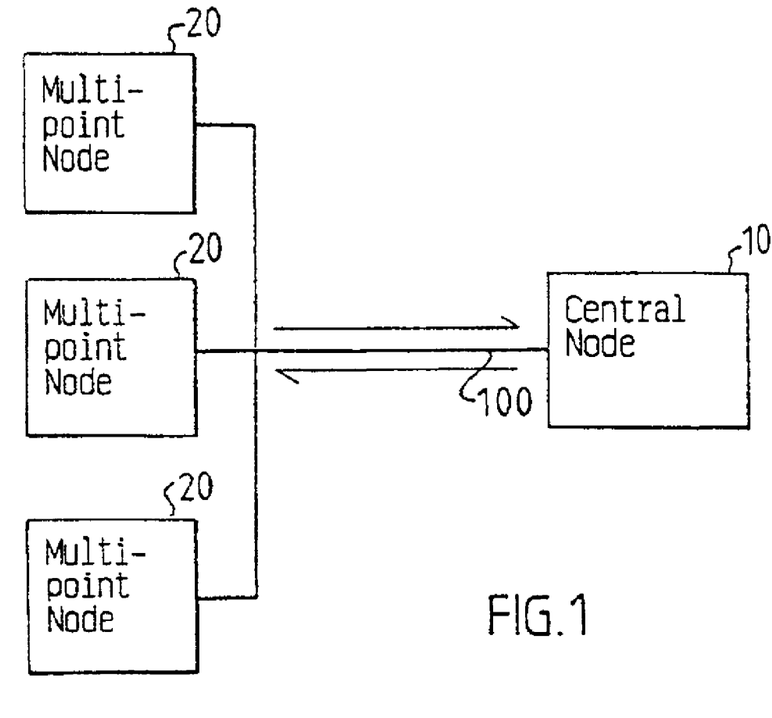
FIG. 1 schematically depicts a multipoint-to-point link in a TDMA packet switched network.

A typical multipoint-to-point link in a TDMA packet switched communication network is illustrated in FIG. 1. Several multipoint nodes 20, three of which are shown in the figure, communicate via a single, shared bi-directional channel with a central node 10. The channel 100 may be a fixed electrical or electro-optical link or an air interface.

A media access control (MAC) mechanism is used by the central node 10 to determine which of the multipoint nodes may use which time slots on the shared channel 100 to transmit packets. It is assumed here that a packet is the amount of information that may be transmitted over the channel 100 in one time slot. Depending on the services utilising this channel, the packet may contain one or several frames, or parts of a frame.

A conventional media access control procedure is illustrated in FIGS. 2a to 2k. FIGS. 2a to 2k show a greatly simplified view of the flow of frames or packets between a central node 10 and one multipoint node 20 in a link as shown in FIG. 1. Each frame is sent in one time slot 30. In each of the FIGS. 2a to 2k the downstream link is shown at the top and the upstream link at the bottom. The dashed lines represent the interfaces between the channel 100 and each of the nodes 10, 20.

It is assumed in the illustrated link that the transmission delay or time of flight between the two nodes is equal to three slot periods. The processing time in the multipoint node is assumed to be equal to a single slot period 30. This is represented by the time slot 31 at the multipoint node 20. Each consecutive figure represents the link at intervals of one time slot.

Figure 2A:
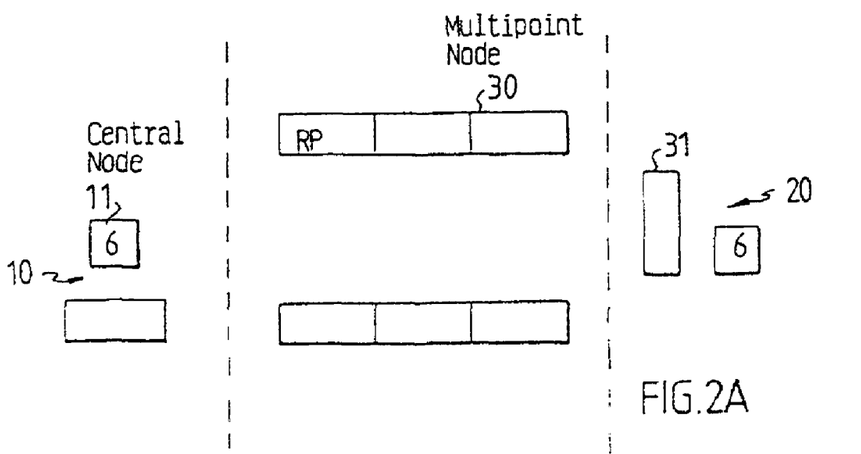
FIGS. 2a to 2k schematically depict the process conventionally utilised for recording the size of a packet queue located at multipoint node in a central node in the network of FIG. 1, and FIGS. 3a to 3l schematically shows the process for adjusting the queue record at a central node in a multipoint-to-point network of FIG. 1 in accordance with the invention.
Figure 2B:
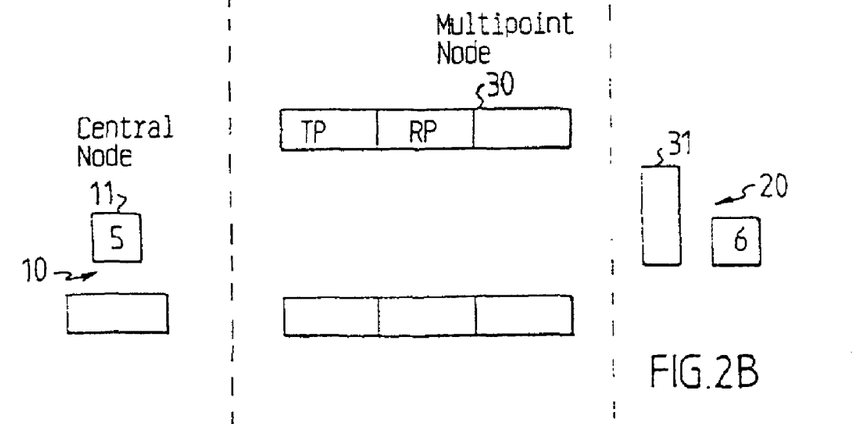

FIG. 2a shows the starting state wherein the multipoint node has a queue length of 6 packets waiting to be sent, and the central node 10 holds a record 11 of this queue length. The central node 10 has just sent a permit to send a request RP to the multipoint node 20. This permit to send a request RP is an invitation to the multipoint node 20 to indicate via a request, Rn, for traffic permits, TP, the number n of permits that are required to send all packets in the queue. The request for permits Rn is therefore effectively a queue size report. In the example illustrated, one permit represents one time slot during which a packet can be sent. However it will be understood that a permit could represent an invitation to send more than one packet, for example in consecutive time slots. Moving on to FIG. 2b, it can be seen that the permit to send a request RP has advanced by one time slot delay across the link, and that the central node 10 has followed this by sending a first traffic permit TP. The issue of this traffic permit TP by the central node 10 has caused the recorded queue length 11 to be decremented by one. However, the actual queue in the multipoint node is still 6, because no packets have yet been sent.

Figure 2C:
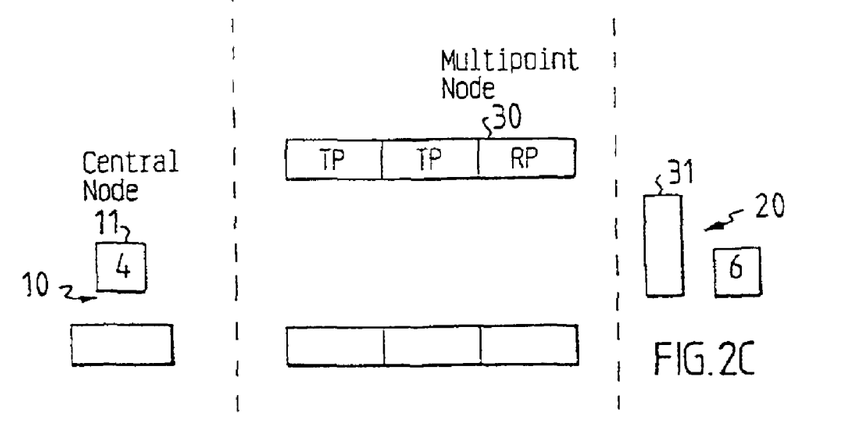
Figure 2D:
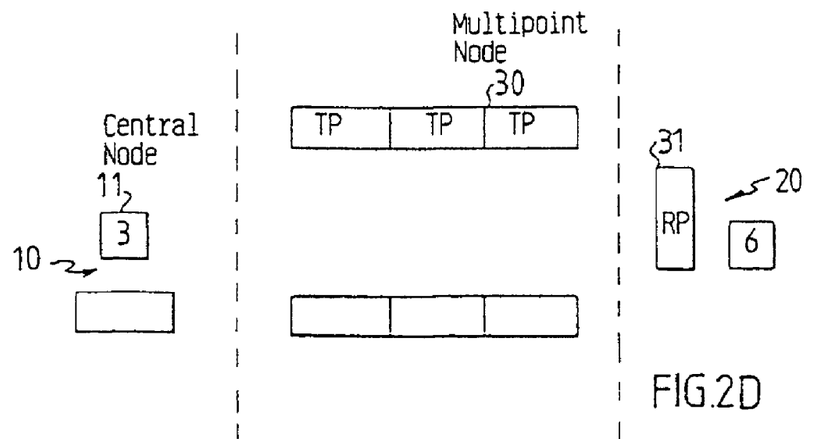
Figure 2E:
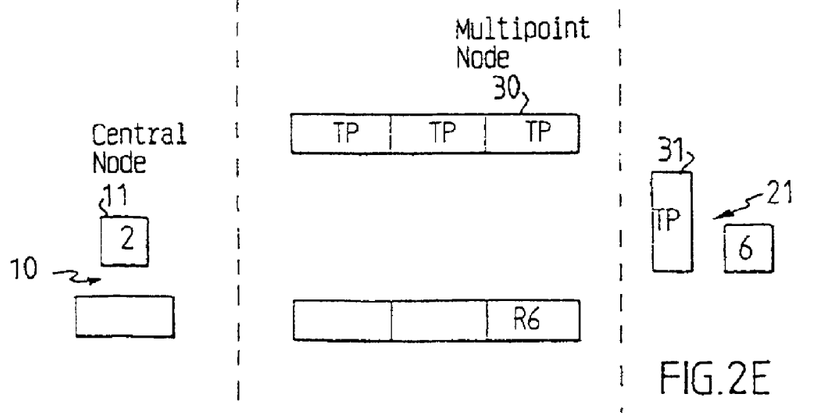

In FIG. 2c a further traffic permit TP has been issued by the central node 10, and the recorded queue length amended to 4. The permit to send a request RP is still in transmission. In FIG. 2d the permit to send a request RP has reached the multipoint node 20 and is being processed. As mentioned above, this will take one slot period as represented by the slot 31. In the meantime, the central node 10 has issued a third traffic permit TP and the recorded queue size 11 has been reduced to 3. In FIG. 2e the permit to send a request RP has been processed by the multipoint node 20 and has resulted in a request for six permits, R6, being sent. The first traffic permit TP has also reached the multipoint node 20, 31 and is ready for processing. At the same time, the central node has issued a fourth traffic permit TP and has modified the recorded queue size to 2.

Figure 2F:
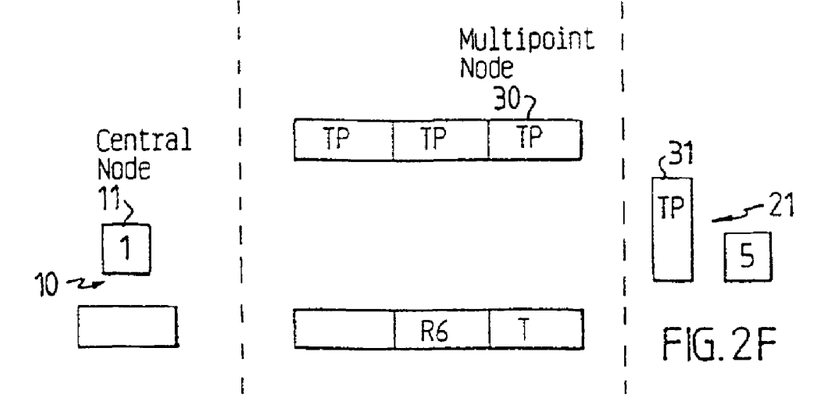
Figure 2G:
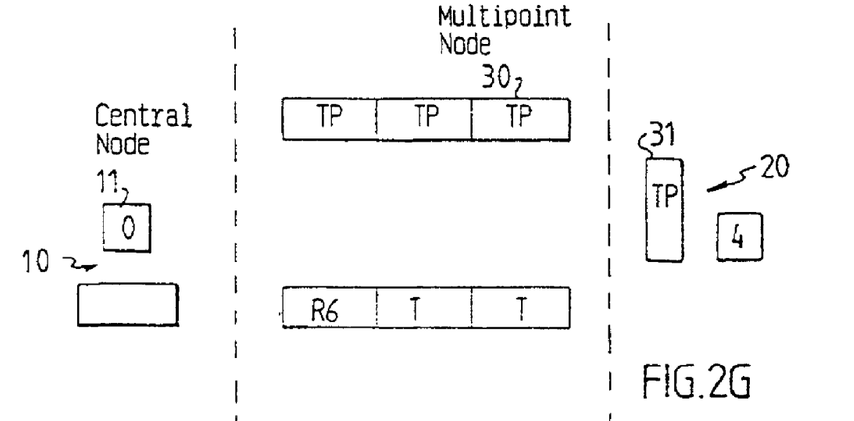
Figure 2H:
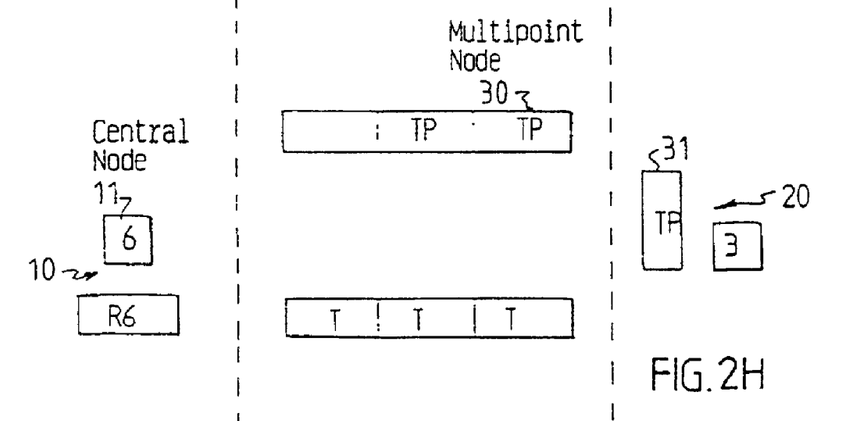
Figure 2I:
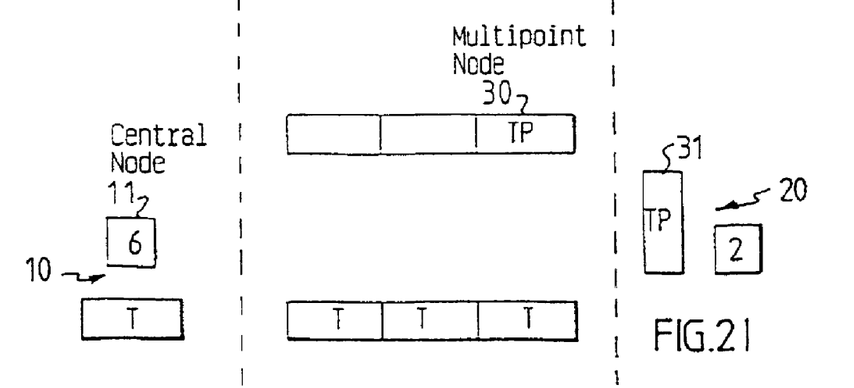
Figure 2J:
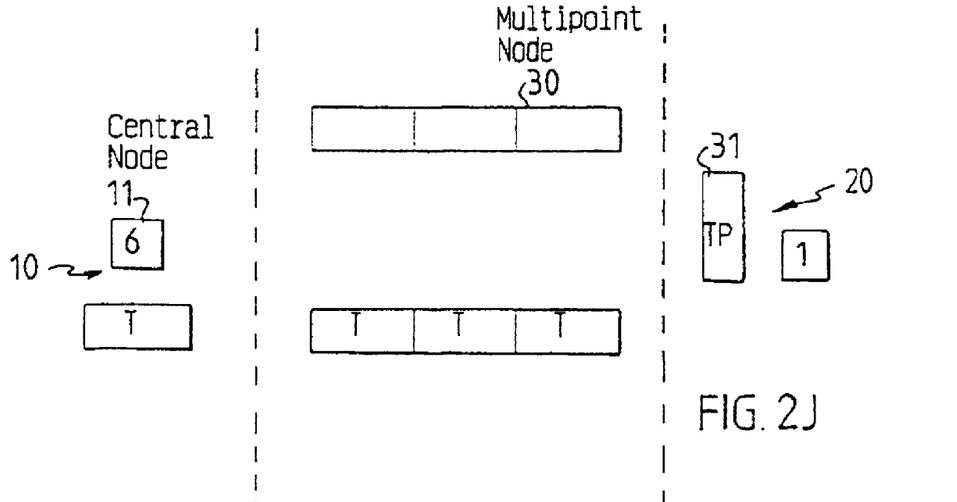
Figure 2K:
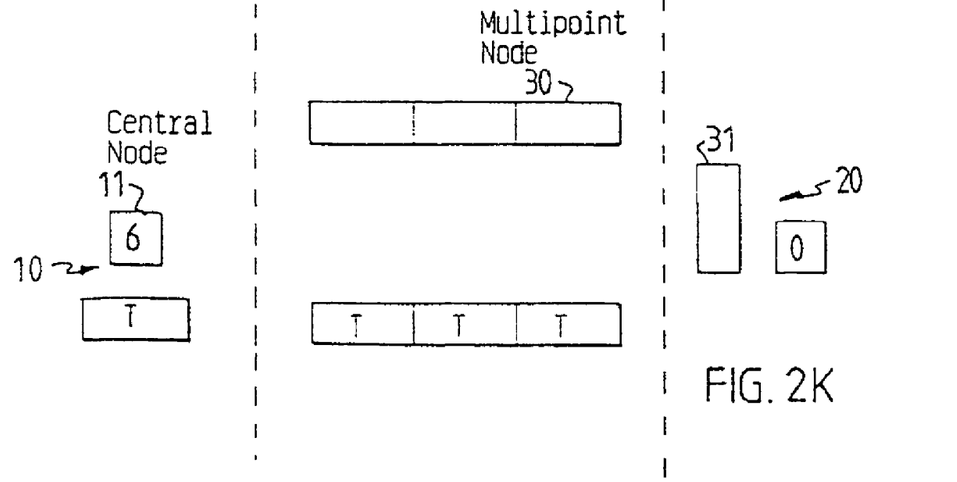

In FIG. 2f, the multipoint node 20 has processed the first traffic permit TP and has sent the first traffic packet in response. The queue at the multipoint node 20 now contains 5 packets. The central node has issued a fifth traffic permit TP, and the queue record 11 has been modified to 1. The queue record is finally reduced to zero in FIG. 2g as a final sixth traffic permit TP is sent. The multipoint node 20 has also responded to the second traffic permit TP by sending a second packet so that the actual queue size at the node 20 is reduced to 4. In FIG. 2h, the central node has received the request for permits R6 which overwrites the queue record 11. The latter is therefore updated to 6. In the meantime the multipoint node 20 continues to send packets in response to the permits. This continues through FIGS. 2i to 2k until all the packets at the multipoint node 20 have been sent in response to the six traffic permits TP. The final queue at the multipoint node 20 is thus zero. However, the recorded queue size 11 at central node 10 is six.

In this particular example, the error in the queue size recording at the central node 10 results from a request for traffic permits Rn being transmitted on the downlink and permits being transmitted on the uplink during the same period. Effectively both nodes are issuing information in ignorance of information that is in transmission.

FIGS. 3a to 3l show the procedure for removing this source of error in accordance with the present invention. In this arrangement, the central node 10 includes a permit memory 12, which may be any temporary storage medium such as a register or a counter or equivalent, for recording the number of traffic permits TP sent for a predetermined period after their emission. This memory 12 effectively stores a history of the traffic permits TP issued in the preceding round trip delay to the multipoint node 20. In the present embodiment, this means that the register 12 is adapted to hold the number of permits sent within the last preceding 7 slot periods. These 7 slot periods correspond to the round trip delay between the central node 10 and a the multipoint node 20. Specifically, the delay is equal to the time required for a traffic permit TP to reach, and be processed by, the multipoint node 31 plus the transmission delay for a traffic packet T sent by the multipoint node 20 to reach the central node 10.

As for the procedure of FIGS. 2a to 2k it is assumed that the delay for processing the request for permits Rn, i.e. for updating the recorded queue size, in the central node is negligible. The procedure according to the invention will now be described with reference to the FIGS. 3a to 3k. These show the same series of events illustrated in FIGS. 2a to 2k for the arrangement according to the invention. FIG. 3l shows the link 3 time slot delays after FIG. 3k.

Figure 3A:
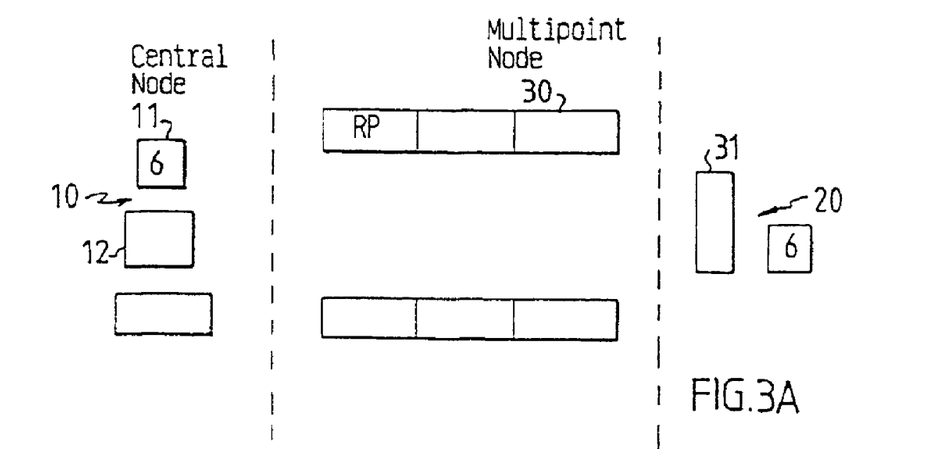

In FIG. 3a a queue of 6 packets are waiting at the multipoint node 20. The central node 10 holds a record 11 of this queue size, and has also just issued a permit to send requests RP. The permit memory 12 is empty because no traffic permits TP have been sent during the preceding 7 slot periods.

Figure 3B:
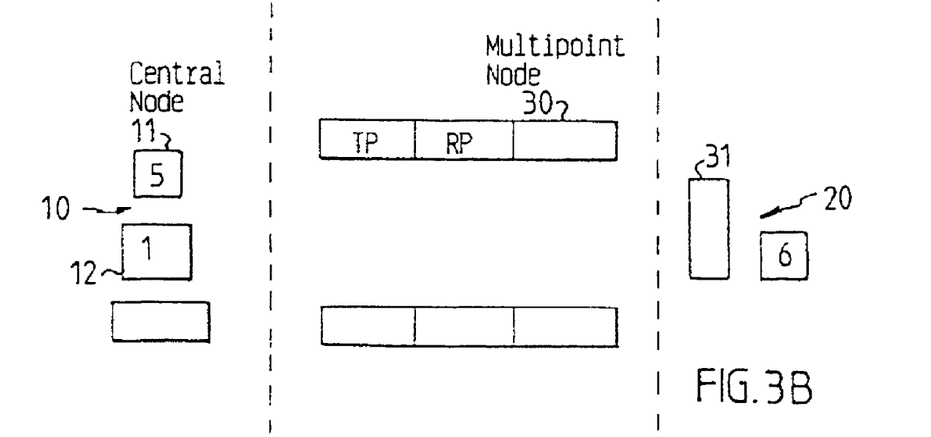
Figure 3C:
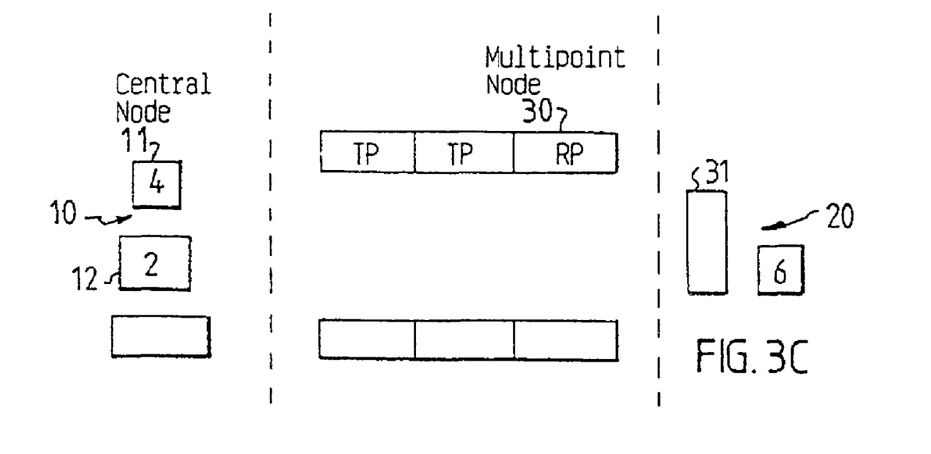
Figure 3D:
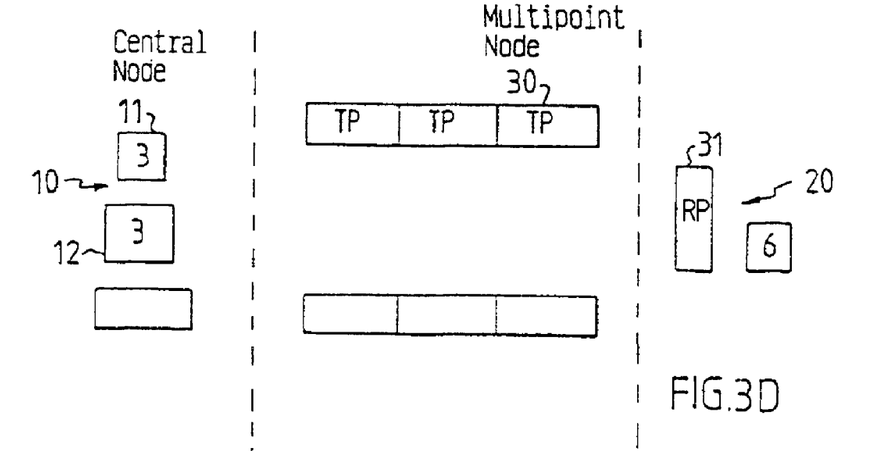
Figure 3E:
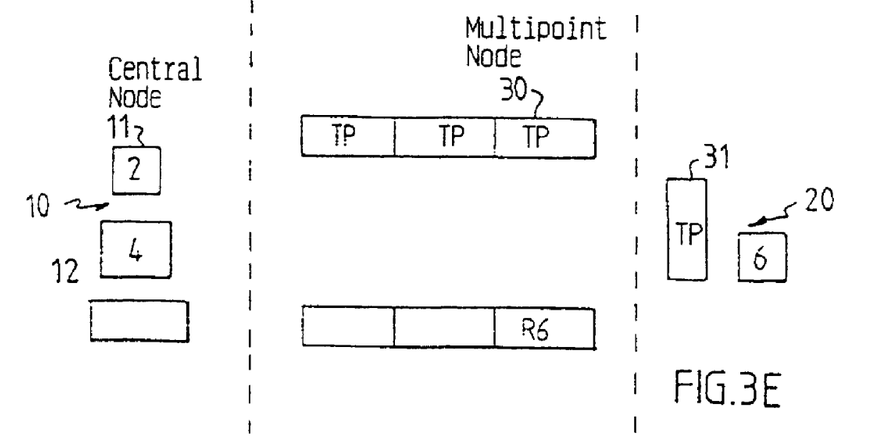
Figure 3F:
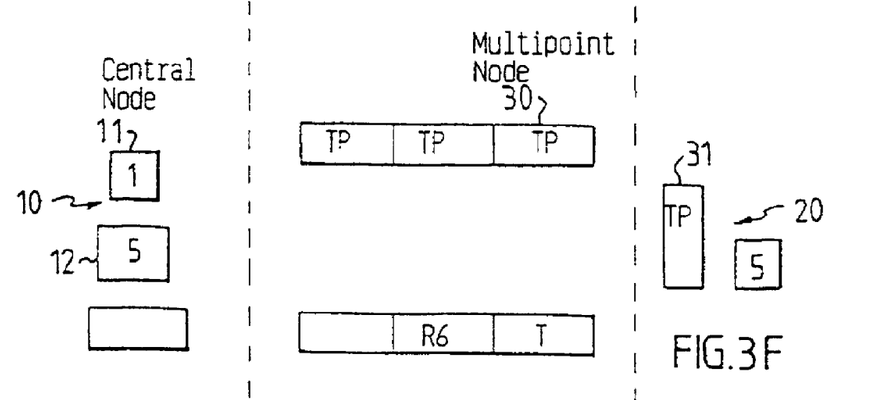
Figure 3G:
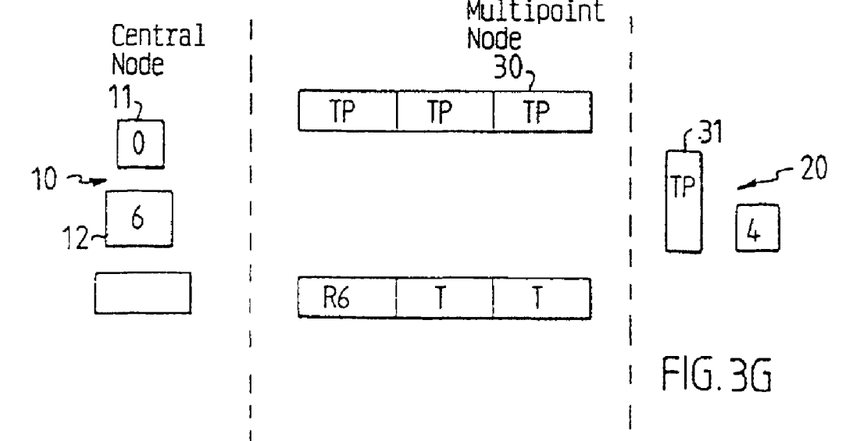

In FIG. 3b a first traffic permit TP is transmitted to follow the permit to send requests RP. This event causes the queue record 11 to be decremented by one. The permit memory 12 is also incremented and holds the value 1.

Figure 3H:
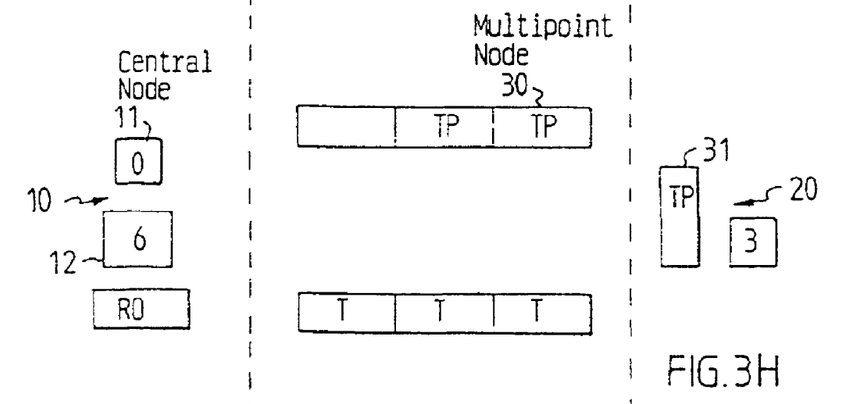
Figure 3I:
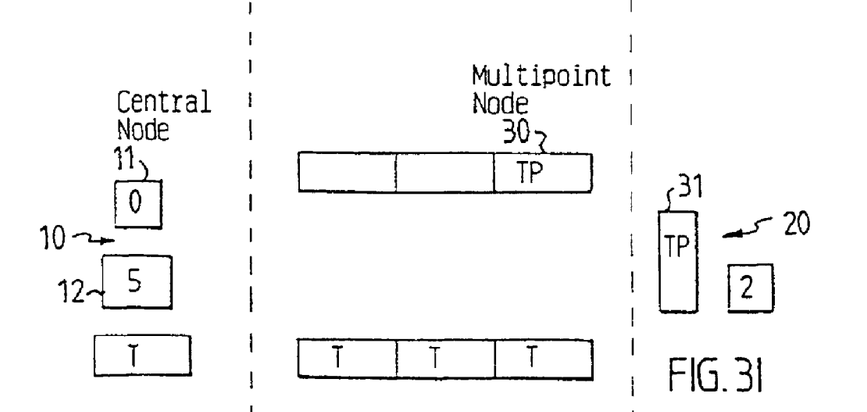
Figure 3J:
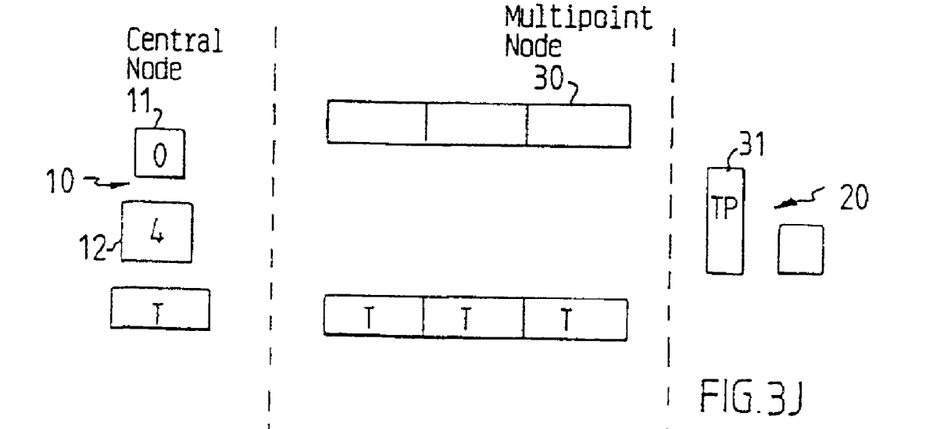
Figure 3K:
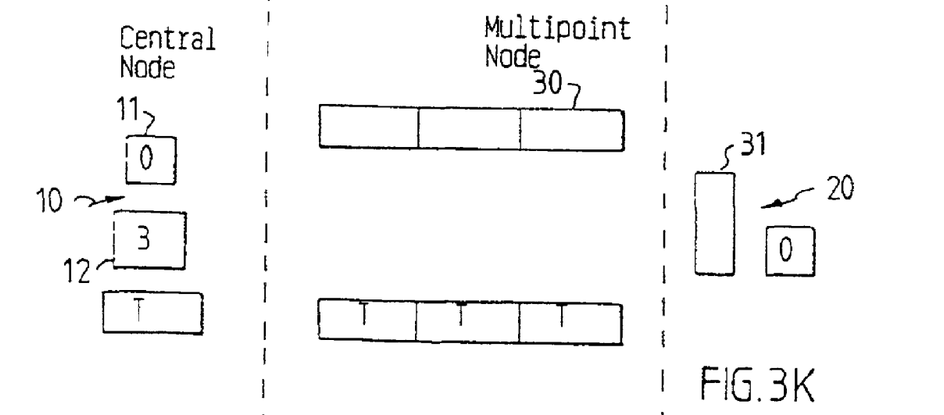
Figure 3L:
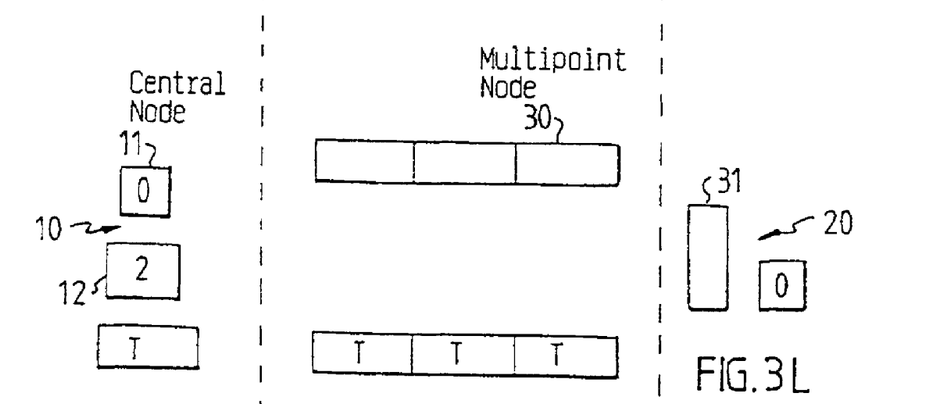

During the following three time slots 30 (FIGS. 3c to 3e) a further three traffic permits TP are issued. The resultant queue record 11 is therefore 2 and the value in the permit memory 12 is 4. In the meantime, the multipoint node 20 has issued a reply to the RP in the form of a request for six permits R6. While this reply R6 is travelling towards the central node 10, two further traffic permits TP are issued (FIG. 3f and 3g) reducing the queue record 11 to zero and bringing the value in the permit memory to 6. At the end of this time slot, the request for six permits R6 has reached the central node 10, this is illustrated in FIG. 3h which shows the situation in the subsequent time slot. It will be remembered that the processing time in the central node is considered to be negligible. However, before the request for permits R6 is used to overwrite the queue record, its value is first adjusted by the number of permits stored in the permit memory 12. Six permits are stored in the memory since the first permit was transmitted 7 time slots previously. The stored permits are subtracted from the request value R6 resulting in a request value of zero. This value is then used to update, or overwrite the recorded queue value 11. Thus the recorded queue value 11 effectively remains unchanged. In the next slot period as shown in FIG. 3i the round-trip delay of 7 time slots has expired for the first traffic permit TP. The permit memory is therefore decremented by one. In FIGS. 3j and 3k the permit memory 12 is decremented further as two more permit delays expire. Finally FIG. 3l shows the state three time slot delays subsequently when the last permit delay has expired and the permit memory 12 is finally set to zero.

It will be understood that the time period during which the permit memory 12 will actually store the records of permits will exceed 7 time slots, because there will inevitably be some finite processing delay associated with the central nod 10.

As a result of the adjustment of the queue size report (permit request) the recorded queue size 11 in the central node 10 will always provide an accurate representation of the number of packets awaiting transmission at the multipoint node 20.

For the multipoint-to-point link shown in FIG. 1, the central node 10 will hold a separate record 11 of the queue size at each of the multipoint nodes 20. Furthermore, the central node will store the number of traffic permits issued during the preceding round trip delay for each individual multipoint node 20. It will be understood that different multipoint nodes may be associated with different round trip delays. Each permit memory 12, or that portion of memory assigned to permits, allocated to a specific multipoint node 20 will thus be adapted to store the permit transmission history for the corresponding delay.

In order to eliminate the risk of the central node 10 underestimating the number of packets waiting at a multipoint node 20, the period during which the permits sent are recorded should be shorter than the round trip delay in terms of frames between the two nodes plus one time slot delay. This prevents any request for permits Rn reporting newly arrived packets from being reduced or decremented by the number of stored permits erroneously. In terms of the simplified model shown in FIGS. 2 and 3, the delay should be less than 8 time slots but at least 7 time slots.

It will be understood that each multipoint node 20 may hold more than one queue, such that different packets awaiting transmission are assigned to different queues and treated with different priority. The central node 10 will also hold these different queue values in the queue record 11 allocated to the multipoint node. In this case, the number of permits issued for packets of different queues will be stored separately and this record used to adjust the corresponding queue size value in the queue record.

What is claimed is:

1. Method for use in a first node of a communication network for managing the transfer of information in packets across a channel from a second node, comprising:

holding a queue record representing the number of packets awaiting transmission at said second node, updating said queue record upon receipt of a queue size value from said second node, and recording the issue of permits allocating time slots on said channel destined for said second node for a predetermined time period after the issue of each permit and adjusting any queue size value received from said second node by the number of recorded permits prior to updating said queue record.

2. Method as claimed in claim 1, wherein the time period is a predetermined time period.

3. Method as claimed in claim 1, wherein the time period is equivalent to the round-trip transmission delay between said first and second nodes.

4. Method as claimed in claim 1, wherein the time period is equivalent to the delay between the first node sending a permit and the second node receiving said permit plus the delay between the second node sending a packet in response to the permit and the first node receiving said packet.

5. Method as claimed in claim 4, wherein the delay includes a processing delay for the second node and for said first node.

6. Method as claimed in claim 1, further comprising:

sending at least one permit when said recorded queue size is greater than zero.

7. Use of the method in claim 1 in a central node of a point-to-multipoint communication network.

8. A node of a communication network adapted to receive information in packets from at least one further node, comprising memory means for storing a queue record representing the number of packets awaiting transmission at said at least one further node, and processing circuitry for updating said queue record upon receipt of a queue size value from said at least one further node and for recording the issue of permits to said at least one further node for a predetermined time period, wherein each permit enables the transfer of at least one packet of information, and for adjusting any incoming queue size value received from said at least one further node on the basis of said recorded permit value.

9. A node as claimed in claim 8, wherein the processing circuitry is arranged to utilize an adjusted queue size value.

10. A node as claimed in claim 8, wherein the delay is equivalent to the round trip delay between said node and said further node.

11. A node as claimed in claim 8, wherein the delay is equivalent to the sum of the time period between transmission of a permit and receipt of said permit by the further node and the time period between transmission of a packet of information by said further node in response to said permit and receipt of said packet by the node.

12. A communication network comprising:

a central node and several multipoint nodes, the multipoint nodes being connected to said central node by a shared medium, said central node including means for storing queue size records representing the number of packets awaiting transmission at each of said multipoint nodes, means for updating each of said queue records upon receipt of a queue size value from a respective one of said multipoint nodes; and means for recording the issue of permits enabling the transfer of at least one packet of information to each of said multipoint nodes for a predetermined delay, and for adjusting any incoming queue size value received from said multipoint nodes on the basis of a respective recorded permit value.

13. A network as claimed in claim 12, wherein said means for updating queue records is arranged to utilize an adjusted corresponding queue size value.

14. A network as claimed in claim 13, wherein said delay is equivalent to the sum of the time period between transmission of a permit and receipt of said permit by the corresponding multipoint node and the delay between the transmission of a packet by said multipoint node and receipt of said packet by said central node.

* * * * *